United States Patent
Li et al.

(10) Patent No.: US 12,494,788 B2
(45) Date of Patent: Dec. 9, 2025

(54) SPREAD SPECTRUM CLOCK GENERATOR, MEMORY STORAGE DEVICE, AND SPREAD SPECTRUM CLOCK GENERATION METHOD ADOPTING MULTIPLE FREQUENCY CHANGE RATES

(71) Applicant: PHISON ELECTRONICS CORP., Miaoli (TW)

(72) Inventors: Kun-Ruei Li, Taichung (TW); Jen-Chu Wu, Hsinchu (TW)

(73) Assignee: PHISON ELECTRONICS CORP., Miaoli (TW)

( * ) Notice: Subject to any disclaimer, the term of this patent is extended or adjusted under 35 U.S.C. 154(b) by 91 days.

(21) Appl. No.: 18/490,767

(22) Filed: Oct. 20, 2023

(65) Prior Publication Data

US 2025/0125808 A1   Apr. 17, 2025

(30) Foreign Application Priority Data

Oct. 13, 2023   (TW) .................................. 112139262

(51) Int. Cl.
| | |
|---|---|
| G06F 1/08 | (2006.01) |
| G11C 7/22 | (2006.01) |
| G11C 29/02 | (2006.01) |
| H03K 3/013 | (2006.01) |
| H03L 7/087 | (2006.01) |
| H03L 7/081 | (2006.01) |

(52) U.S. Cl.
CPC ................ H03L 7/087 (2013.01); G06F 1/08 (2013.01); G11C 7/222 (2013.01); G11C 29/023 (2013.01); H03K 3/013 (2013.01); H03L 7/081 (2013.01)

(58) Field of Classification Search
CPC ..... G06F 1/08; G06F 1/10; G06F 1/12; G06F 1/04; G11C 7/222; H03L 7/087
See application file for complete search history.

(56) References Cited

U.S. PATENT DOCUMENTS

| | | | | |
|---|---|---|---|---|
| 10,789,999 | B1 * | 9/2020 | Chang ...................... | H03K 3/84 |
| 2005/0071132 | A1 * | 3/2005 | Liu ....................... | G01R 23/167 |
| | | | | 702/189 |
| 2015/0200707 | A1 * | 7/2015 | Kim ..................... | H04B 1/7097 |
| | | | | 375/148 |
| 2017/0093604 | A1 | 3/2017 | Dan | |
| 2021/0242874 | A1 * | 8/2021 | Ma ........................... | H03L 7/18 |

FOREIGN PATENT DOCUMENTS

CN        110214418        9/2019

OTHER PUBLICATIONS

"Office Action of Taiwan Counterpart Application", issued on Jul. 17, 2024, pp. 1-10.

* cited by examiner

Primary Examiner — Raymond N Phan
(74) Attorney, Agent, or Firm — JCIPRNET (57) ABSTRACT

A spread spectrum clock generator, a memory storage device, and a spread spectrum clock generation method are provided. The method includes: generating a spread spectrum clock signal according to a reference clock signal and a control signal; and adjusting the control signal to change a frequency of the spread spectrum clock signal based on multiple frequency change rates, wherein an initial frequency change rate of the spread spectrum clock is greater than a frequency change rate of the spread spectrum clock within a target time range.

30 Claims, 6 Drawing Sheets

SPREAD SPECTRUM CLOCK GENERATOR, MEMORY STORAGE DEVICE, AND SPREAD SPECTRUM CLOCK GENERATION METHOD ADOPTING MULTIPLE FREQUENCY CHANGE RATES

CROSS-REFERENCE TO RELATED APPLICATION

This application claims the priority benefit of Taiwan application serial no. 112139262, filed on Oct. 13, 2023. The entirety of the above-mentioned patent application is hereby incorporated by reference herein and made a part of this specification.

BACKGROUND

Technical Field

The disclosure relates to a spread spectrum clock generator, a memory storage device, and a spread spectrum clock generation method.

Description of Related Art

Electronic devices such as mobile phones and notebook computers have grown rapidly in the past few years, which has led to a rapid increase in consumer demand for storage media. As the rewritable non-volatile memory module (for example, a flash memory) has characteristics such as non-volatile data, power saving, small volume, and no mechanical structure, the rewritable non-volatile memory module is very suitable for being built into various portable multimedia devices exemplified above.

The spread spectrum (SS) clock signal has characteristics such as low electromagnetic interference (EMI). Therefore, the spread spectrum clock signal may be applied to an electronic device such as a memory storage device. However, although the spread spectrum clock signal can reduce electromagnetic interference compared to the fixed frequency clock signal, electromagnetic interference caused by the spread spectrum clock signal will increase within a specific time range, thereby reducing system reliability.

SUMMARY

The disclosure provides a spread spectrum clock generator, a memory storage device, and a spread spectrum clock generation method, which can further reduce electromagnetic interference caused by a spread spectrum clock signal, thereby improving system reliability.

An exemplary embodiment of the disclosure provides a spread spectrum clock generator, which includes a clock generation circuit and a frequency control circuit. The clock generation circuit is configured to generate a spread spectrum clock signal according to a reference clock signal and a control signal. The frequency control circuit is coupled to the clock generation circuit. The frequency control circuit is configured to adjust the control signal to change a frequency of the spread spectrum clock signal based on multiple frequency change rates. An initial frequency change rate of the spread spectrum clock signal is greater than a frequency change rate of the spread spectrum clock signal within a target time range.

An exemplary embodiment of the disclosure also provides a memory storage device, which includes a connection interface unit, a rewritable non-volatile memory module, and a memory control circuit unit. The connection interface unit is configured to couple to a host system. The memory control circuit unit is coupled to the connection interface unit and the rewritable non-volatile memory module. A spread spectrum clock signal generator is disposed in the connection interface unit. The spread spectrum clock signal generator is configured to generate a spread spectrum clock signal according to a reference clock signal and a control signal; and adjust the control signal to change a frequency of the spread spectrum clock signal based on multiple frequency change rates. An initial frequency change rate of the spread spectrum clock signal is greater than a frequency change rate of the spread spectrum clock signal within a target time range.

An exemplary embodiment of the disclosure also provides a spread spectrum clock generation method, which is used in a memory storage device. The spread spectrum clock generation method includes the following steps. A spread spectrum clock signal is generated according to a reference clock signal and a control signal. The control signal is adjusted to change a frequency of the spread spectrum clock signal based on multiple frequency change rates. An initial frequency change rate of the spread spectrum clock signal is greater than a frequency change rate of the spread spectrum clock signal within a target time range.

Based on the above, after the spread spectrum clock signal is generated according to the reference clock signal and the control signal, the control signal may be adjusted within a specific time range to change the frequency of the spread spectrum clock signal based on the frequency change rates. In particular, the initial frequency change rate of the spread spectrum clock signal is greater than the frequency change rate of the spread spectrum clock signal within the target time range, which can further reduce electromagnetic interference caused by the spread spectrum clock signal, thereby improving system reliability.

DESCRIPTION OF THE EMBODIMENTS

Multiple embodiments are provided below to illustrate the disclosure. However, the disclosure is not limited to the illustrated embodiments. Appropriate combinations between embodiments are also allowed. The word "coupling" used throughout the specification (including the claims) of the disclosure may refer to any direct or indirect connection means. For example, if a first device is described as being coupled to a second device, it should be interpreted as that the first device may be directly connected to the second device or that the first device may be indirectly connected to the second device through other devices or certain connection means. In addition, the word "signal" may refer to at least one current, voltage, charge, temperature, data, or any other one or more signals.

Figure 1:
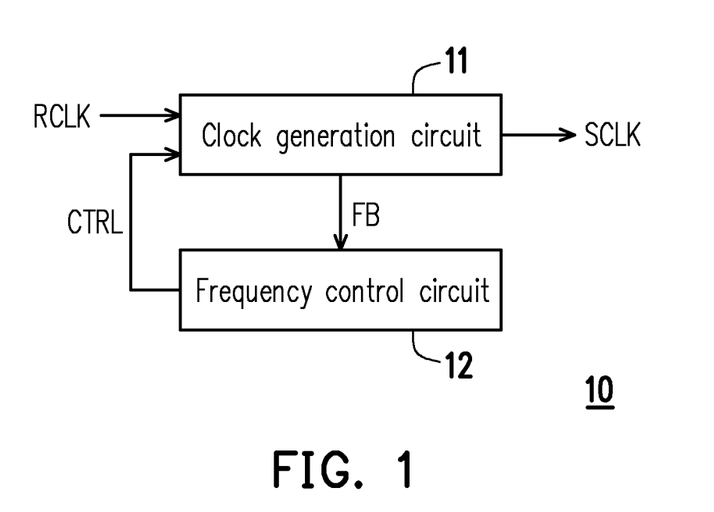
FIG. 1 is a schematic diagram of a spread spectrum clock generator according to an exemplary embodiment of the disclosure.

FIG. 1 is a schematic diagram of a spread spectrum clock generator according to an exemplary embodiment of the disclosure. Please refer to FIG. 1. A spread spectrum clock generator 10 may be disposed in a memory storage device or other types of electronic devices. The spread spectrum clock generator 10 may include a clock generation circuit 11 and a frequency control circuit 12. The clock generation circuit 11 is coupled to the frequency control circuit 12.

The clock generation circuit 11 may be configured to receive a signal (also referred to as a reference clock signal) RCLK and a signal (also referred to as a control signal) CTRL. The clock generation circuit 11 may generate a signal (also referred to as a spread spectrum clock signal) SCLK according to the signals RCLK and CTRL. For example, the frequency of the signal SCLK may change continuously over time. It should be noted that the signal CTRL may be configured to adjust the frequency of the signal SCLK based on the frequency of the signal RCLK. The frequency control circuit 12 may be configured to receive a signal (also referred to as a feedback signal) FB and generate the signal CTRL according to the signal FB. For example, the frequency of the signal SCLK may be the same as the frequency of the signal FB.

In an exemplary embodiment, during a period when the clock generation circuit 11 generates the signal SCLK, the frequency control circuit 12 may continuously adjust the signal CTRL to change the frequency of the signal SCLK based on multiple frequency change rates. In particular, an initial frequency change rate of the signal SCLK may be greater than a frequency change rate of the signal SCLK within a specific time range (also referred to as a target time range). For example, the initial frequency change rate refers to the preset frequency change rate of the signal SCLK. For example, without actively changing the frequency change rate of the signal SCLK, the spread spectrum clock generator 10 may adjust the frequency of the signal SCLK based on the initial frequency change rate and continuously output the signal SCLK.

In an exemplary embodiment, during the period when the clock generation circuit 11 generates the signal SCLK, the frequency control circuit 12 may continuously detect whether the signal SCLK enters the target time range. In response to the signal SCLK entering the target time range, the frequency control circuit 12 may adjust the signal CTRL to reduce the frequency change rate of the signal SCLK. Thereby, within the target time range, the frequency change rate of the signal SCLK may be smaller than the initial frequency change rate of the signal SCLK. Alternatively, from another perspective, in an exemplary embodiment, the frequency change rate (that is, the initial frequency change rate) of the signal SCLK outside the target time range may be greater than the frequency change rate of the signal SCLK within the target time range.

In an exemplary embodiment, the higher the frequency change rate of the signal SCLK, the greater the change amplitude of the frequency of the signal SCLK over time. On the contrary, the lower the frequency change rate of the signal SCLK, the smaller the change amplitude of the frequency of the signal SCLK over time. Therefore, in an exemplary embodiment, the frequency change rate (that is, the initial frequency change rate) of the signal SCLK outside the target time range is greater than the frequency change rate of the signal SCLK within the target time range, which means that the frequency of the signal SCLK changes with a relatively small amplitude over time within the target time range, while the frequency of the signal SCLK changes with a relatively large amplitude over time outside the target time range. For example, outside the target time range, the frequency of the signal SCLK may change based on the initial frequency change rate of the signal SCLK.

Figure 2:
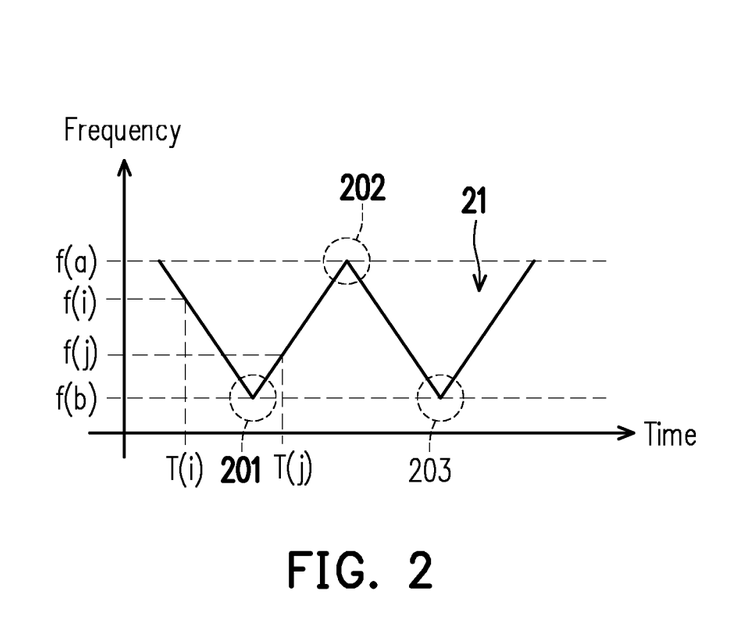
FIG. 2 is a schematic diagram of a frequency of a traditional spread spectrum clock signal changing over time.

FIG. 2 is a schematic diagram of a frequency of a traditional spread spectrum clock signal changing over time. Please refer to FIG. 1 and FIG. 2. A waveform 21 may be used to represent the change of the frequency of the traditional spread spectrum clock signal over time. For example, the frequency of the spread spectrum clock signal may change between frequencies f(a) and f(b) over time. For example, at a time point T(i), the frequency of the spread spectrum clock signal may be a frequency f(i). At a time point T(j), the frequency of the spread spectrum clock signal may be a frequency f(j). The time point T(i) is different from the time point T(j), and the frequency f(i) is different from the frequency f(j).

It should be noted that traditionally, although the spread spectrum clock signal may reduce electromagnetic interference (EMI) compared to the fixed frequency clock signal, electromagnetic interference caused by the spread spectrum clock signal still increases within a specific time range (for example, a time range 201 to 203 in FIG. 2), thereby reducing system reliability. However, in an exemplary embodiment, through dynamically adjusting (such as reducing) the frequency change rate of the signal SCLK within the target time range, electromagnetic interference caused by the signal SCLK can be effectively reduced.

Figure 3:
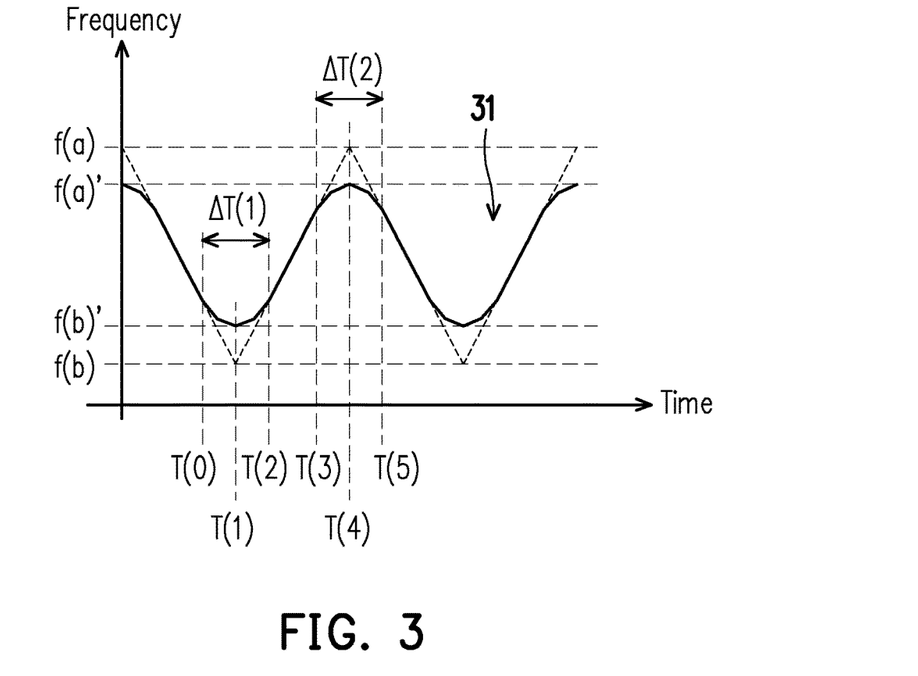
FIG. 3 is a schematic diagram of dynamically adjusting a frequency change rate of a spread spectrum clock signal within a target time range according to an exemplary embodiment of the disclosure.

FIG. 3 is a schematic diagram of dynamically adjusting a frequency change rate of a spread spectrum clock signal within a target time range according to an exemplary embodiment of the disclosure. Please refer to FIG. 1 and FIG. 3, a waveform 31 may be used to represent the change of the frequency of the signal SCLK over time. For example, the frequency of the signal SCLK may change between frequencies f(a)' and f(b)' over time. The frequency f(a)' is smaller than the frequency f(a), and the frequency f(b)' is greater than the frequency f(b). That is, in an exemplary embodiment, compared to the waveform 21 of FIG. 2, the waveform 31 represents that the change range of the frequency of the signal SCLK becomes smaller (or becomes narrower). In addition, the slope of the waveform 31 may be used to represent the frequency change rate of the signal SCLK. For example, when the slope of the waveform 31 is greater, it means that the frequency change rate of the signal SCLK is greater. On the contrary, when the slope of waveform 31 is smaller, it means that the frequency change rate of the signal SCLK is smaller.

In an exemplary embodiment, the target time range includes time range ΔT(1) and/or ΔT(2). In the target time range, the frequency change rate of the signal SCLK may be reduced, such as being reduced to be lower than the initial frequency change rate of the signal SCLK. In addition, before entering the target time range or after leaving the target time range, the frequency change rate of the signal SCLK may be increased, such as being restored to the initial frequency change rate of the signal SCLK. Taking FIG. 3 as an example, the slope of the waveform 31 within the target time range (that is, the time range ΔT(1) and/or ΔT(2)) is smaller than the slope of the waveform 31 outside the target time range (that is, the time range ΔT(1) and/or ΔT(2)). In other words, the frequency change rate of the signal SCLK outside the target time range is greater than the frequency change rate of the signal SCLK within the target time range.

In an exemplary embodiment, a starting point of the time range ΔT(1) is a time point T(0), a center point of the time range ΔT(1) is a time point T(1), and an end point of the time range ΔT(1) is a time point T(2). In an exemplary embodiment, at a turning point (for example, the time point T(1)) within the time range ΔT(1), a frequency value of the signal SCLK changes from decreasing over time to increasing over time. For example, between the time points T(1) and T(2), the frequency value of the signal SCLK decreases over time. However, after passing the time point T(2), the frequency value of the signal SCLK changes to increasing over time.

In an exemplary embodiment, a starting point of the time range ΔT(2) is a time point T(3), a center point of the time range ΔT(2) is a time point T(4), and an end point of the time range ΔT(2) is a time point T(5). In an exemplary embodiment, at a turning point (for example, the time point T(4)) within the time range ΔT(2), a frequency value of the signal SCLK changes from increasing over time to decreasing over time. For example, between the time points T(3) and T(4), the frequency value of the signal SCLK increases over time. However, after passing the time point T(4), the frequency value of the signal SCLK changes to decreasing over time.

In an exemplary embodiment, within the target time range (for example, the time range ΔT(1) and/or ΔT(2)), the closer to the turning point (for example, the time point T(1) and/or T(4)), the frequency change rate of the signal SCLK may be lower. On the contrary, within the target time range (for example, the time range ΔT(1) and/or ΔT(2)), the farther away from the turning point (for example, the time point T(1) and/or T(4)), the frequency change rate of the signal SCLK may be higher.

In an exemplary embodiment, one target time range may be divided into multiple sub-target time ranges. For example, the sub-target time ranges may include a first sub-target time range and a second sub-target time range. In particular, the first sub-target time range is closer to the turning point than the second sub-target time range, and the frequency change rate of the signal SCLK within the first sub-target time range may be smaller than the frequency change rate of the signal SCLK within the second sub-target time range.

Figure 4:
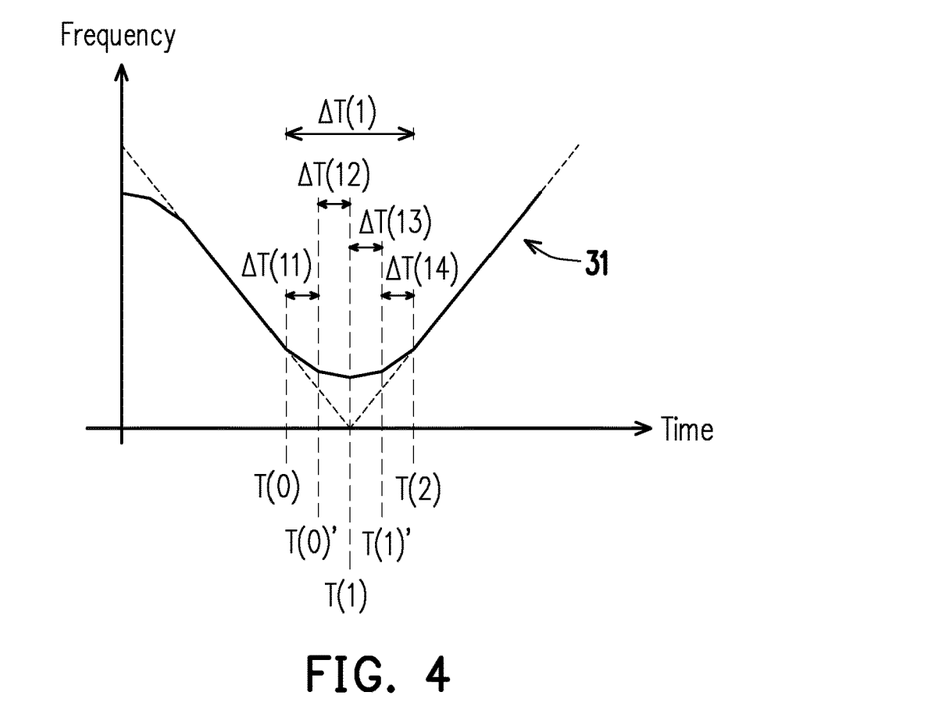
FIG. 4 is a schematic diagram of dynamically adjusting a frequency change rate of a spread spectrum clock signal within a target time range according to an exemplary embodiment of the disclosure.

FIG. 4 is a schematic diagram of dynamically adjusting a frequency change rate of a spread spectrum clock signal within a target time range according to an exemplary embodiment of the disclosure. Please refer to FIG. 3 and FIG. 4. In an exemplary embodiment, the time range ΔT(1) may be divided into sub-time ranges ΔT(11) to ΔT(14). The sub-time range ΔT(11) is between time points T(0) and T(0)'. The sub-time range ΔT(12) is between the time points T(0)' and T(1). The sub-time range ΔT(13) is between time points T(1) and T(1)'. The sub-time range ΔT(14) is between the time points T(1)' and T(2).

It should be noted that in the time range ΔT(1), compared to the sub-time ranges ΔT(11) and ΔT(14) (that is, a second sub-target time range), the sub-time ranges ΔT(12) and ΔT(13) (that is, the first sub-target time range) is closer to the turning point (that is, the time point T(1)). Furthermore, the slope of the waveform 31 within the sub-time ranges ΔT(12) and ΔT(13) is smaller than the slope of the waveform 31 within the sub-time ranges ΔT(11) and ΔT(14). In other words, the frequency change rate of the signal SCLK with the sub-time ranges ΔT(12) and ΔT(13) is smaller than the frequency change rate of the signal SCLK within the sub-time ranges ΔT(11) and ΔT(14).

Figure 5:
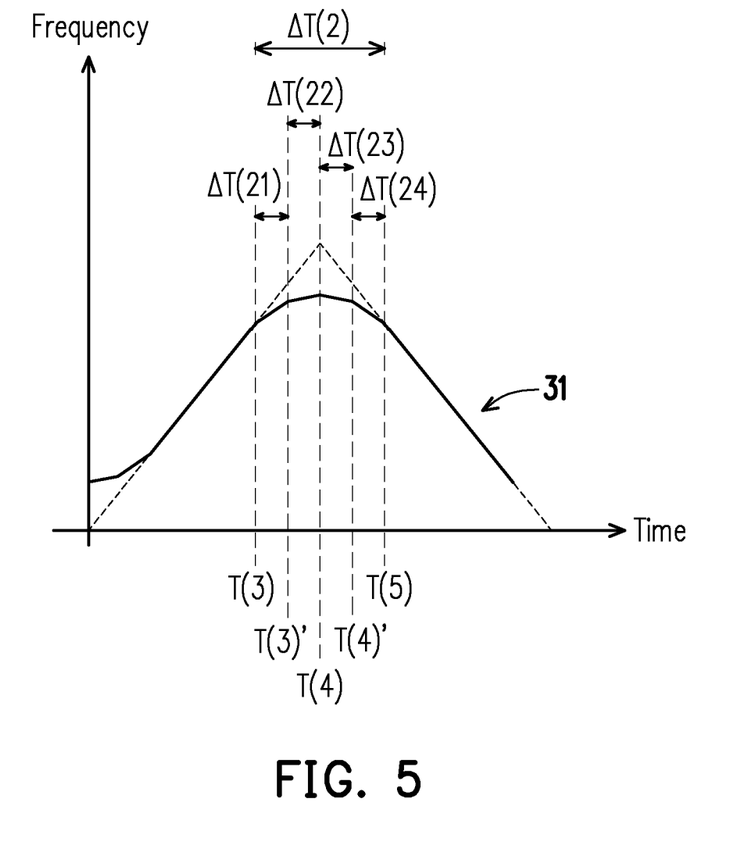
FIG. 5 is a schematic diagram of dynamically adjusting a frequency change rate of a spread spectrum clock signal within a target time range according to an exemplary embodiment of the disclosure.

FIG. 5 is a schematic diagram of dynamically adjusting a frequency change rate of a spread spectrum clock signal within a target time range according to an exemplary embodiment of the disclosure. Please refer to FIG. 3 and FIG. 5. In an exemplary embodiment, the time range ΔT(2) may be divided into sub-time ranges ΔT(21) to ΔT(24). The sub-time range ΔT(21) is between time points T(3) and T(3)'. The sub-time range ΔT(22) is between the time points T(3)' and T(4). The sub-time range ΔT(23) is between time points T(4) and T(4)'. The sub-time range ΔT(24) is between the time points T(4)' and T(5).

It should be noted that in the time range ΔT(2), compared to the sub-time ranges ΔT(21) and ΔT(24) (that is, the second sub-target time range), the sub-time ranges ΔT(22) and ΔT(23) (that is, the first sub-target time range) is closer to the turning point (that is, the time point T(2)). Furthermore, the slope of the waveform 31 within the sub-time ranges ΔT(22) and ΔT(23) is smaller than the slope of the waveform 31 within the sub-time ranges ΔT(21) and ΔT(24). In other words, the frequency change rate of the signal SCLK within the sub-time ranges ΔT(22) and ΔT(23) is smaller than the frequency change rate of the signal SCLK within the sub-time ranges ΔT(21) and ΔT(24).

In an exemplary embodiment, the frequency change rate of the signal SCLK within the target time range may be 10% to 80% of the initial frequency change rate of the signal SCLK. Alternatively, in an exemplary embodiment, the frequency change rate of the signal SCLK within the target time range may also be adjusted according to practical requirements and is not limited by the disclosure. In an exemplary embodiment, through dynamically adjusting (such as reducing) the frequency change rate of the signal SCLK within the target time range, electromagnetic interference caused by the signal SCLK can be effectively reduced.

Figure 6:
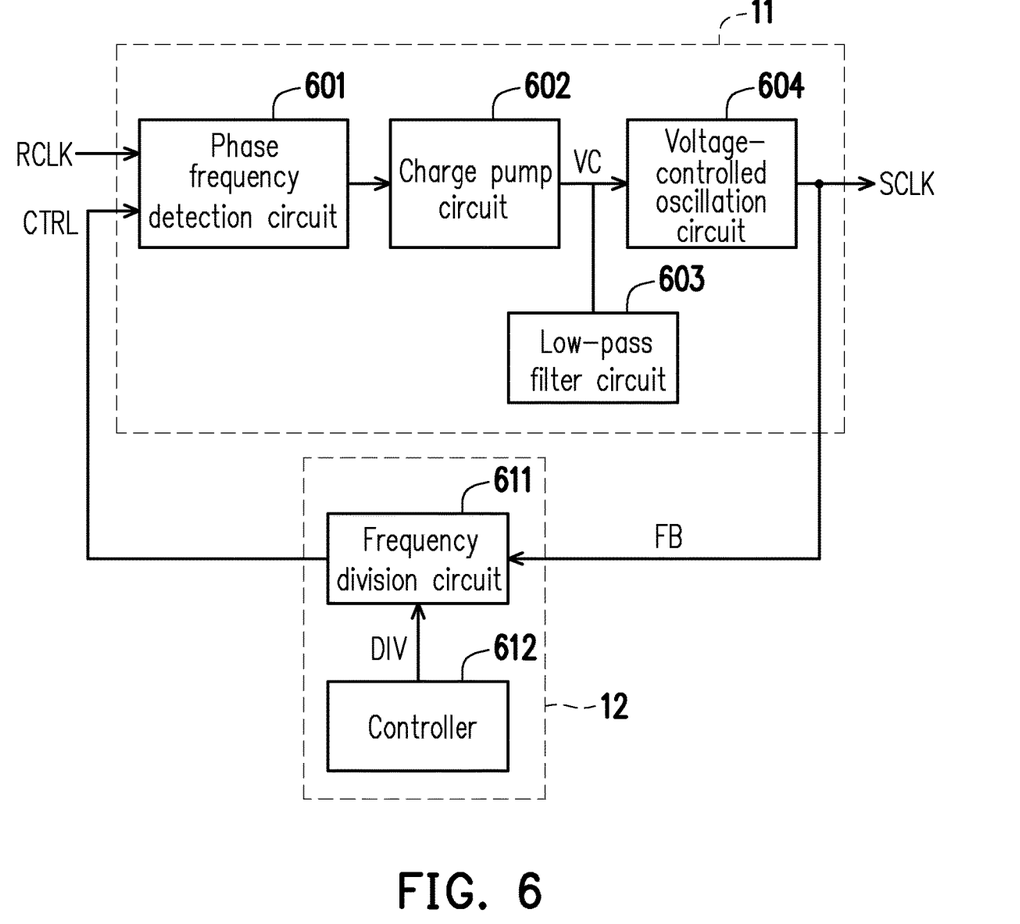
FIG. 6 is a schematic diagram of a spread spectrum clock generator according to an exemplary embodiment of the disclosure.

FIG. 6 is a schematic diagram of a spread spectrum clock generator according to an exemplary embodiment of the disclosure. Please refer to FIG. 6. In an exemplary embodiment, the clock generation circuit 11 may include a phase frequency detection circuit 601, a charge pump circuit 602, a low-pass filter circuit 603, and a voltage-controlled oscillation circuit 604.

The phase frequency detection circuit 601 is coupled to the frequency control circuit 12. The phase frequency detection circuit 601 may receive the signal RCLK and the signal CTRL and detect a phase difference or a frequency difference between the signal RCLK and the signal CTRL.

The charge pump circuit 602 is coupled to the phase frequency detection circuit 601, the low-pass filter circuit 603, and the voltage-controlled oscillation circuit 604. The charge pump circuit 602 may cooperate with the low-pass filter circuit 603 to generate a voltage (also referred to as a control voltage) VC according to the phase difference or the frequency difference (that is, the output of the phase frequency detection circuit 601) between the signal RCLK and the signal CTRL. The voltage VC may be configured to control the voltage-controlled oscillation circuit 604 to generate the signal SCLK. For example, the frequency of the signal SCLK may change according to changes in the voltage VC. For example, the voltage-controlled oscillation circuit 604 may include a voltage-controlled oscillator.

In an exemplary embodiment, the frequency control circuit 12 includes a frequency division circuit 611 and a controller 612. The frequency division circuit 611 is coupled to the phase frequency detection circuit 601 and the voltage-controlled oscillation circuit 604. The controller 612 is coupled to the frequency division circuit 611 and is configured to control the output of the frequency division circuit 611 to adjust the signal CTRL. In an exemplary embodiment, the controller 612 may provide a signal (also referred to as a frequency division control signal) DIV to the frequency division circuit 611. The frequency division circuit 611 may receive the signals FB and DIV and execute frequency division according to the signals FB and DIV to generate the signal CTRL. For example, the frequency division circuit 611 may include a frequency divider.

Figure 7:
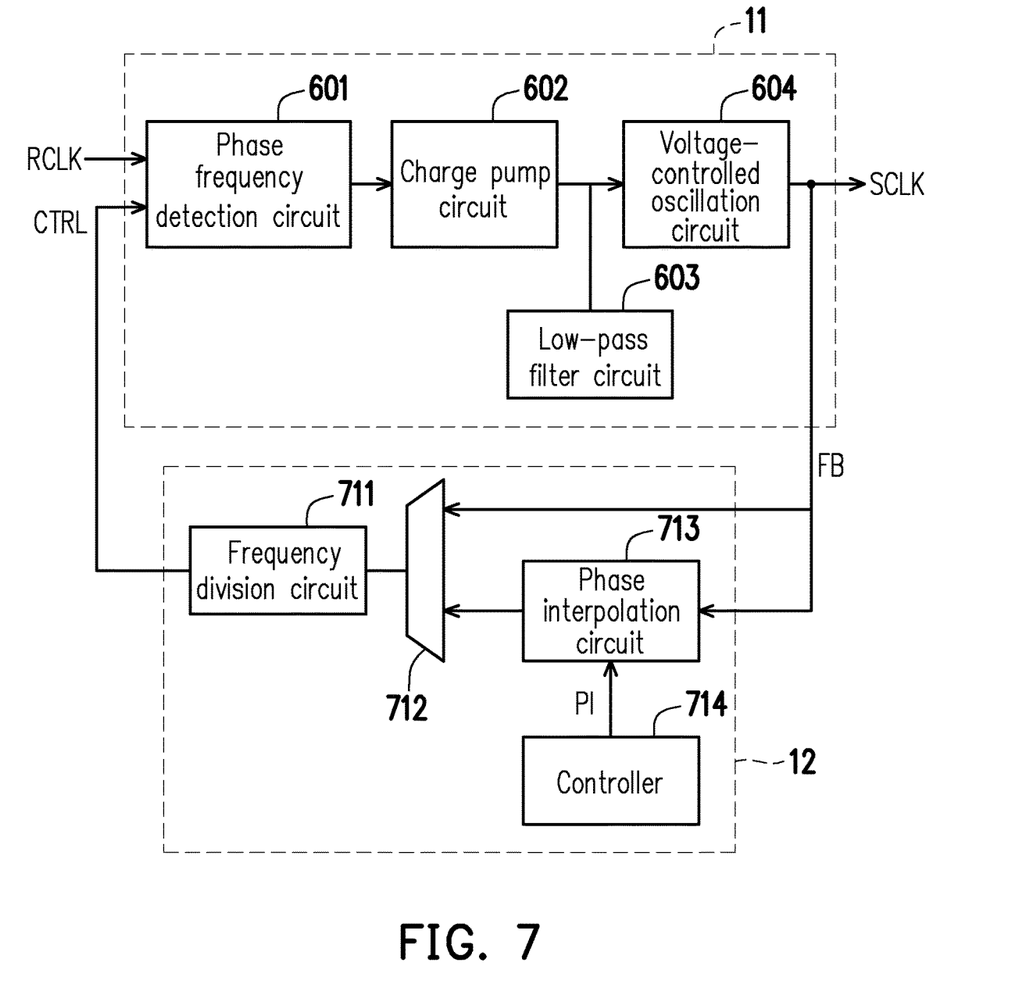
FIG. 7 is a schematic diagram of a spread spectrum clock generator according to an exemplary embodiment of the disclosure.

FIG. 7 is a schematic diagram of a spread spectrum clock generator according to an exemplary embodiment of the disclosure. Please refer to FIG. 7. In an exemplary embodiment, the clock generation circuit 11 may include a phase frequency detection circuit 601, a charge pump circuit 602, a low-pass filter circuit 603, and a voltage-controlled oscillation circuit 604. The operation description of the phase frequency detection circuit 601, the charge pump circuit 602, the low-pass filter circuit 603, and the voltage-controlled oscillation circuit 604 may be referred to the exemplary embodiment of FIG. 6 and will not be repeated here.

In an exemplary embodiment, the frequency control circuit 12 includes a frequency division circuit 711, a multiplexer circuit 712, a phase interpolation circuit 713, and a controller 714. The multiplexer circuit 712 is coupled to the frequency division circuit 711, the voltage-controlled oscillation circuit 604, and the phase interpolation circuit 713. For example, the frequency division circuit 711 is coupled to an output terminal of the multiplexer circuit 712. The voltage-controlled oscillator circuit 604 is coupled to a first input terminal of the multiplexer circuit 712. The phase interpolation circuit 713 is coupled to a second input terminal of the multiplexer circuit 712. The phase interpolation circuit 713 is further coupled to the voltage-controlled oscillation circuit 604 and the controller 714.

In an exemplary embodiment, the controller 714 may dynamically control the multiplexer circuit 712 to turn on the first input terminal or the second input terminal. In the case where the first input terminal is turned on, the frequency division circuit 711 may generate the signal CTRL according to the signal FB. In the case where the second input terminal is turned on, the controller 714 may provide a signal (also referred to as an interpolation control signal) PI to the phase interpolation circuit 713. The phase interpolation circuit 713 may execute phase interpolation according to the signals FB and PI. Then, the frequency division circuit 711 may generate the signal CTRL according to the output of the phase interpolation circuit 713. For example, the frequency division circuit 711 may include a frequency divider, and the phase interpolation circuit 713 may include a phase interpolator.

Figure 8:
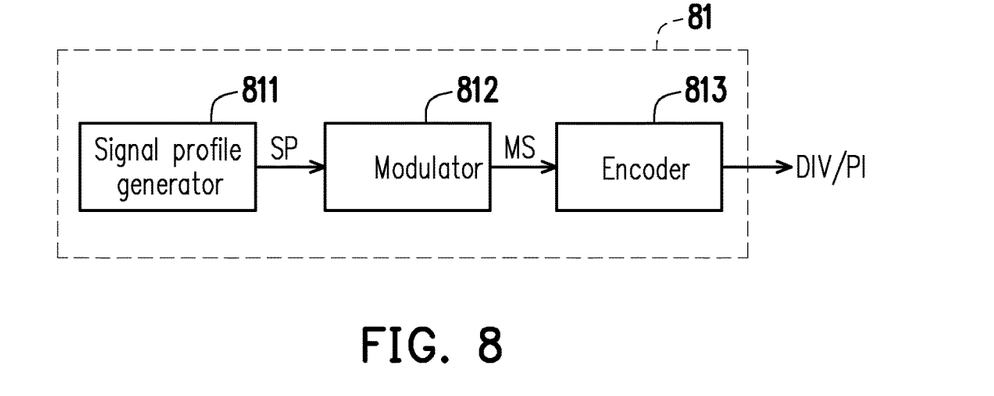
FIG. 8 is a schematic diagram of a controller according to an exemplary embodiment of the disclosure.

FIG. 8 is a schematic diagram of a controller according to an exemplary embodiment of the disclosure. Please refer to FIG. 8. In an exemplary embodiment, the controller 612 of FIG. 6 and/or the controller 714 of FIG. 7 may include a controller 81. The controller 81 includes a signal profile generator 811, a modulator 812, and an encoder 813. The modulator 812 is coupled to the signal profile generator 811 and the encoder 813.

The signal profile generator 811 is configured to provide a signal (also referred to as a fundamental frequency control signal) SP. The waveform of the signal SP may affect the frequency and/or the frequency change rate of the signal SCLK. For example, the waveform of the signal SP may be consistent with or correspond to the frequency change rate (or the waveform 31 of FIG. 3) of the signal SCLK. The modulator 812 may receive the signal SP and generate a signal (also referred to as a modulated signal) MS according to the signal SP. For example, the modulator 812 may modulate the signal SP to generate the signal MS. For example, the modulator 812 may include a delta-sigma modulator, and the disclosure does not limit the type of the modulator 812.

The encoder 813 may receive the signal MS and generate the signal DIV of FIG. 6 or the signal PI of FIG. 7 according to the signal MS. For example, the encoder 813 may encode the signal MS to generate the signal DIV or PI. Thereafter, the signal DIV or PI may be respectively provided to the frequency division circuit 611 of FIG. 6 or the phase interpolation circuit 713 of FIG. 7 to adjust the signal CTRL output by the frequency control circuit 12.

It should be noted that the circuit structures shown in FIG. 6, FIG. 7, and FIG. 8 are only examples and are not used to limit the disclosure. In an exemplary embodiment, the coupling relationships between electronic circuits in the circuit structures shown in FIG. 6, FIG. 7, and FIG. 8 may be adjusted according to practical requirements. In an exemplary embodiment, each electronic circuit in the circuit structures shown in FIG. 6, FIG. 7, and FIG. 8 may also be replaced by an electronic circuit having the same or similar functions. In addition, in an exemplary embodiment, the circuit structures shown in FIG. 6, FIG. 7, and FIG. 8 may also include other types of electronic circuits to provide other additional functions and are not limited by the disclosure.

In an exemplary embodiment, the spread spectrum clock generator 10 of FIG. 1 may be disposed in a memory storage device or a memory control circuit unit to operate together with the memory storage device or the memory control circuit unit. However, in an exemplary embodiment, the spread spectrum clock generator 10 of FIG. 1 may also be disposed in other types of electronic devices.

Figure 9:
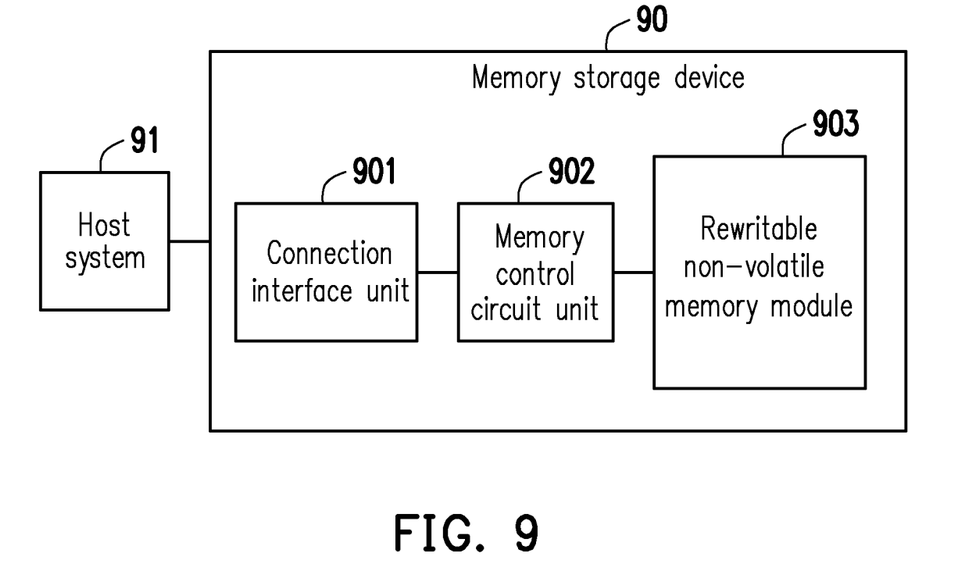
FIG. 9 is a schematic diagram of a memory storage device according to an exemplary embodiment of the disclosure.

FIG. 9 is a schematic diagram of a memory storage device according to an exemplary embodiment of the disclosure. Please refer to FIG. 9. A memory storage device 90 may be used together with a host system 91. For example, the host system 91 may write data to the memory storage device 90 or read data from the memory storage device 90. The host system 91 may be any system that may substantially cooperate with the memory storage device 90 to store data, such as a smartphone, a tablet, a desktop computer, a notebook computer, a digital camera, a video camera, a communication device, an audio player, a video player, etc.

The memory storage device 90 includes a connection interface unit 901, a memory control circuit unit 902, and a rewritable non-volatile memory module 903. The connection interface unit 901 is configured to connect the memory storage device 90 to the host system 91. For example, the connection interface unit 901 is compatible with the serial advanced technology attachment (SATA) standard, the parallel advanced technology attachment (PATA) standard, the peripheral component interconnect (PCI) express standard, the universal serial bus (USB) standard, or other suitable standards. The connection interface unit 901 may be packaged in one chip with the memory control circuit unit 902 or the connection interface unit 901 may also be arranged outside a chip including the memory control circuit unit 902.

The memory control circuit unit 902 is configured to execute multiple logic gates or control commands implemented in the form of hardware or the form of firmware. The memory control circuit unit 902 may perform operations such as writing, reading, and erasing data in the rewritable non-volatile memory module 903 according to commands of the host system 91.

The rewritable non-volatile memory module 903 may be coupled to the memory control circuit unit 902 and is configured to store data written by the host system 91. The rewritable non-volatile memory module 903 may include a single level cell (SLC) NAND flash memory module (that is, a flash memory module that may store 1 bit in one memory cell), a multi level cell (MLC) NAND flash memory module (that is, a flash memory module that may store 2 bits in one memory cell), a triple level cell (TLC) NAND flash memory module (that is, a flash memory module that may store 3 bits in one memory cell), a quad level cell (QLC) NAND flash memory module (that is, a flash memory module that may store 4 bits in one memory cell), other flash memory modules, or other memory modules having the same or similar characteristics.

In an exemplary embodiment, the rewritable non-volatile memory module 903 of FIG. 9 may include a flash memory module. In an exemplary embodiment, the memory control circuit unit 902 of FIG. 9 may include a flash memory controller for controlling the flash memory module. In an exemplary embodiment, the spread spectrum clock generator 10 of FIG. 1 may be disposed in the connection interface unit 901, the memory control circuit unit 902, or the rewritable non-volatile memory module 903 of FIG. 9 to provide the spread spectrum clock signal SCLK required for device operation.

Figure 10:
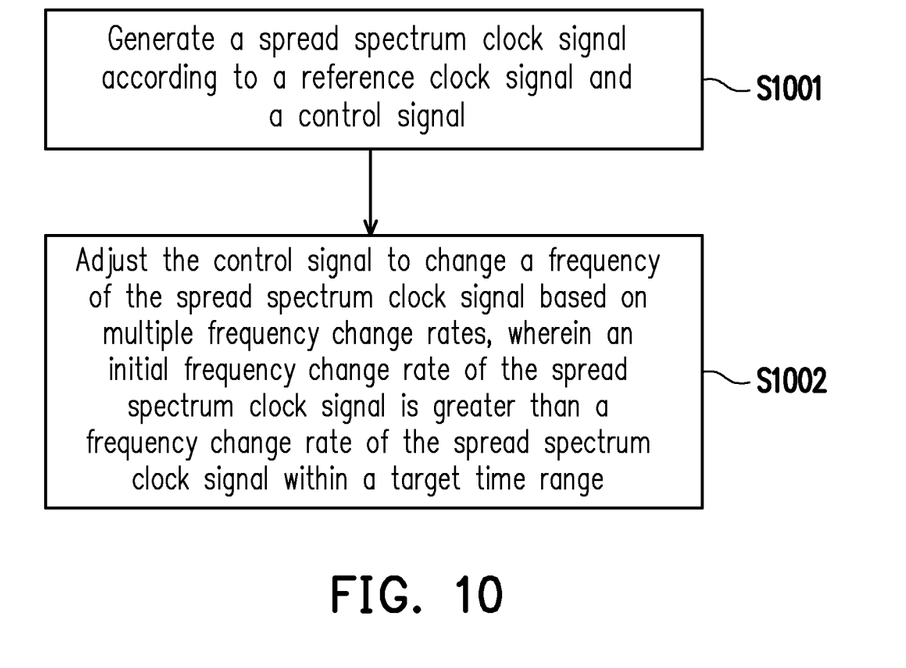
FIG. 10 is a flowchart of a spread spectrum clock generation method according to an exemplary embodiment of the disclosure.

FIG. 10 is a flowchart of a spread spectrum clock generation method according to an exemplary embodiment of the disclosure. Please refer to FIG. 10. In Step S1001, a spread spectrum clock signal is generated according to a reference clock signal and a control signal. In Step S1002, the control signal is adjusted to change a frequency of the spread spectrum clock signal based on multiple frequency change rates, wherein an initial frequency change rate of the spread spectrum clock signal is greater than a frequency change rate of the spread spectrum clock signal within a target time range.

However, each step in FIG. 10 has been described in detail above and will not be described again here. It is worth noting that each step in FIG. 10 may be implemented as multiple program codes or circuits and is not limited by the disclosure. In addition, the method of FIG. 10 may be used in conjunction with the above exemplary embodiments or may be used alone and is not limited by the disclosure.

In summary, the spread spectrum clock generator, the memory storage device, and the spread spectrum clock generation method provided by the exemplary embodiments of the disclosure may dynamically adjust the frequency change rate of the spread spectrum clock signal, which can further reduce electromagnetic interference caused by the spread spectrum clock signal, thereby improving system reliability.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A spread spectrum clock generator, comprising:
   a clock generation circuit, configured to generate a spread spectrum clock signal according to a reference clock signal and a control signal; and
   a frequency control circuit, coupled to the clock generation circuit,
   wherein the frequency control circuit is configured to adjust the control signal to change a frequency of the spread spectrum clock signal based on a plurality of frequency change rates,
   wherein an initial frequency change rate of the spread spectrum clock signal is greater than a frequency change rate of the spread spectrum clock signal within a target time range, and a frequency change rate of the spread spectrum clock signal at a time point is positively correlated to a time difference between the time point and a turning point within the target time range.

2. The spread spectrum clock generator according to claim 1, wherein an operation of adjusting the control signal by the frequency control circuit comprises:
   detecting whether the spread spectrum clock signal enters the target time range; and
   in response to the spread spectrum clock signal entering the target time range, adjusting the control signal to reduce the frequency change rate of the spread spectrum clock signal.

3. The spread spectrum clock generator according to claim 1, wherein a frequency change rate of the spread spectrum clock signal outside the target time range is greater than the frequency change rate of the spread spectrum clock signal within the target time range.

4. The spread spectrum clock generator according to claim 1, wherein at the turning point within the target time range, a frequency value of the spread spectrum clock signal changes from decreasing over time to increasing over time or from increasing over time to decreasing over time.

5. The spread spectrum clock generator according to claim 1, wherein the frequency change rate of the spread spectrum clock signal within the target time range is 10% to 80% of the initial frequency change rate.

6. The spread spectrum clock generator according to claim 1, wherein the clock generation circuit comprises:
   a phase frequency detection circuit, coupled to the frequency control circuit;
   a charge pump circuit, coupled to the phase frequency detection circuit; and
   a voltage-controlled oscillation circuit, coupled to the charge pump circuit and the frequency control circuit,
   wherein the phase frequency detection circuit is configured to detect a phase difference or a frequency difference between the reference clock signal and the control signal, and
   the charge pump circuit is configured to control the voltage-controlled oscillation circuit to generate the spread spectrum clock signal according to the phase difference or the frequency difference.

7. The spread spectrum clock generator according to claim 1, wherein the frequency control circuit comprises:
   a frequency division circuit, coupled to the clock generation circuit; and a controller, coupled to the frequency division circuit,
wherein the controller is configured to control an output of the frequency division circuit to adjust the control signal.

8. The spread spectrum clock generator according to claim 1, wherein the frequency control circuit comprises:
a frequency division circuit, coupled to the clock generation circuit;
a multiplexer circuit, coupled to the clock generation circuit and the frequency division circuit;
a phase interpolation circuit, coupled to the clock generation circuit and the multiplexer circuit; and
a controller, coupled to the phase interpolation circuit, wherein the controller is configured to control an output of the phase interpolation circuit to adjust the control signal.

9. The spread spectrum clock generator according to claim 1, wherein the frequency control circuit comprises:
a controller, configured to control a frequency division circuit or a phase interpolation circuit to adjust the control signal,
wherein the controller comprises:
a signal profile generator, configured to provide a fundamental frequency control signal;
a modulator, coupled to the signal profile generator and configured to generate a modulated signal according to the fundamental frequency control signal; and
an encoder, coupled to the modulator and configured to generate an encoded signal according to the modulated signal, wherein the encoded signal is configured to be provided to the frequency division circuit or the phase interpolation circuit to adjust the control signal.

10. The spread spectrum clock generator according to claim 4, wherein the target time range comprises a first sub-target time range and a second sub-target time range, the first sub-target time range is closer to the turning point than the second sub-target time range, and a frequency change rate of the spread spectrum clock signal within the first sub-target time range is smaller than a frequency change rate of the spread spectrum clock signal within the second sub-target time range.

11. A memory storage device, comprising:
a connection interface unit, configured to couple to a host system;
a rewritable non-volatile memory module;
a memory control circuit unit, coupled to the connection interface unit and the rewritable non-volatile memory module; and
a spread spectrum clock signal generator, disposed in the connection interface unit,
wherein the spread spectrum clock signal generator is configured to:
generate a spread spectrum clock signal according to a reference clock signal and a control signal; and
adjust the control signal to change a frequency of the spread spectrum clock signal based on a plurality of frequency change rates,
wherein an initial frequency change rate of the spread spectrum clock signal is greater than a frequency change rate of the spread spectrum clock signal within a target time range, and a frequency change rate of the spread spectrum clock signal at a time point is positively correlated to a time difference between the time point and a turning point within the target time range.

12. The memory storage device according to claim 11, wherein an operation of adjusting the control signal comprises:
detecting whether the spread spectrum clock signal enters the target time range; and
in response to the spread spectrum clock signal entering the target time range, adjusting the control signal to reduce the frequency change rate of the spread spectrum clock signal.

13. The memory storage device according to claim 11, wherein a frequency change rate of the spread spectrum clock signal outside the target time range is greater than the frequency change rate of the spread spectrum clock signal within the target time range.

14. The memory storage device according to claim 11, wherein at the turning point within the target time range, a frequency value of the spread spectrum clock signal changes from decreasing over time to increasing over time or from increasing over time to decreasing over time.

15. The memory storage device according to claim 11, wherein the frequency change rate of the spread spectrum clock signal within the target time range is 10% to 80% of the initial frequency change rate.

16. The memory storage device according to claim 11, wherein the spread spectrum clock signal generator comprises:
a phase frequency detection circuit;
a charge pump circuit, coupled to the phase frequency detection circuit; and
a voltage-controlled oscillation circuit, coupled to the charge pump circuit,
wherein the phase frequency detection circuit is configured to detect a phase difference or a frequency difference between the reference clock signal and the control signal, and
the charge pump circuit is configured to control the voltage-controlled oscillation circuit to generate the spread spectrum clock signal according to the phase difference or the frequency difference.

17. The memory storage device according to claim 11, wherein the spread spectrum clock signal generator comprises:
a frequency division circuit; and
a controller, coupled to the frequency division circuit, wherein the controller is configured to control an output of the frequency division circuit to adjust the control signal.

18. The memory storage device according to claim 11, wherein the spread spectrum clock signal generator comprises:
a frequency division circuit;
a multiplexer circuit, coupled to the frequency division circuit;
a phase interpolation circuit, coupled to the multiplexer circuit; and
a controller, coupled to the phase interpolation circuit, wherein the controller is configured to control an output of the phase interpolation circuit to adjust the control signal.

19. The memory storage device according to claim 11, wherein the spread spectrum clock signal generator comprises:
a controller, configured to control a frequency division circuit or a phase interpolation circuit to adjust the control signal,
wherein the controller comprises:
a signal profile generator, configured to provide a fundamental frequency control signal;

a modulator, coupled to the signal profile generator and configured to generate a modulated signal according to the fundamental frequency control signal; and an encoder, coupled to the modulator and configured to generate an encoded signal according to the modulated signal, wherein the encoded signal is configured to be provided to the frequency division circuit or the phase interpolation circuit to adjust the control signal.

20. The memory storage device according to claim 14, wherein the target time range comprises a first sub-target time range and a second sub-target time range, the first sub-target time range is closer to the turning point than the second sub-target time range, and a frequency change rate of the spread spectrum clock signal within the first sub-target time range is smaller than a frequency change rate of the spread spectrum clock signal within the second sub-target time range.

21. A spread spectrum clock generation method, used in a memory storage device, the spread spectrum clock generation method comprising:

generating a spread spectrum clock signal according to a reference clock signal and a control signal; and adjusting the control signal to change a frequency of the spread spectrum clock signal based on a plurality of frequency change rates, wherein an initial frequency change rate of the spread spectrum clock signal is greater than a frequency change rate of the spread spectrum clock signal within a target time range, and a frequency change rate of the spread spectrum clock signal at a time point is positively correlated to a time difference between the time point and a turning point within the target time range.

22. The spread spectrum clock generation method according to claim 21, wherein the step of adjusting the control signal comprises:

detecting whether the spread spectrum clock signal enters the target time range; and in response to the spread spectrum clock signal entering the target time range, adjusting the control signal to reduce the frequency change rate of the spread spectrum clock signal.

23. The spread spectrum clock generation method according to claim 21, wherein a frequency change rate of the spread spectrum clock signal outside the target time range is greater than the frequency change rate of the spread spectrum clock signal within the target time range.

24. The spread spectrum clock generation method according to claim 21, wherein at the turning point within the target time range, a frequency value of the spread spectrum clock signal changes from decreasing over time to increasing over time or from increasing over time to decreasing over time.

25. The spread spectrum clock generation method according to claim 21, wherein the frequency change rate of the spread spectrum clock signal within the target time range is 10% to 80% of the initial frequency change rate.

26. The spread spectrum clock generation method according to claim 21, wherein the step of generating the spread spectrum clock signal according to the reference clock signal and the control signal comprises:

detecting a phase difference or a frequency difference between the reference clock signal and the control signal; and controlling the voltage-controlled oscillation circuit to generate the spread spectrum clock signal according to the phase difference or the frequency difference.

27. The spread spectrum clock generation method according to claim 21, wherein the step of adjusting the control signal comprises:

controlling an output of a frequency division circuit to adjust the control signal.

28. The spread spectrum clock generation method according to claim 21, wherein the step of adjusting the control signal comprises:

controlling an output of a phase interpolation circuit to adjust the control signal.

29. The spread spectrum clock generation method according to claim 21, wherein the step of adjusting the control signal comprises:

providing a fundamental frequency control signal;

generating a modulated signal according to the fundamental frequency control signal; and generating an encoded signal according to the modulated signal, wherein the encoded signal is configured to be provided to a frequency division circuit or a phase interpolation circuit to adjust the control signal.

30. The spread spectrum clock generation method according to claim 24, wherein the target time range comprises a first sub-target time range and a second sub-target time range, the first sub-target time range is closer to the turning point than the second sub-target time range, and a frequency change rate of the spread spectrum clock signal within the first sub-target time range is smaller than a frequency change rate of the spread spectrum clock signal within the second sub-target time range.

* * * * *